(12) United States Patent
Osawa et al.

(10) Patent No.: US 12,159,596 B2
(45) Date of Patent: Dec. 3, 2024

(54) DISPLAY DEVICE

(71) Applicant: Japan Display Inc., Tokyo (JP)

(72) Inventors: Shuichi Osawa, Tokyo (JP);
Yoshikatsu Imazeki, Tokyo (JP);
Yoichi Kamijo, Tokyo (JP); Koichi Miyasaka, Tokyo (JP); Yoshifumi Kamei, Tokyo (JP)

(73) Assignee: Japan Display Inc., Tokyo (JP)

( * ) Notice: Subject to any disclaimer, the term of this patent is extended or adjusted under 35 U.S.C. 154(b) by 55 days.

(21) Appl. No.: 18/329,617

(22) Filed: Jun. 6, 2023

(65) Prior Publication Data

US 2023/0410756 A1    Dec. 21, 2023

(30) Foreign Application Priority Data

Jun. 10, 2022  (JP) ................. 2022-094445

(51) Int. Cl.
*G09G 3/34*    (2006.01)
*G02F 1/1335*  (2006.01)
*G09G 5/02*    (2006.01)

(52) U.S. Cl.
CPC ..... *G09G 3/3413* (2013.01); *G02F 1/133514* (2013.01); *G09G 5/02* (2013.01); *G09G 2320/0666* (2013.01)

(58) Field of Classification Search
CPC ... G09G 3/3413; G09G 5/02; G02F 1/133514
See application file for complete search history.

(56) References Cited

U.S. PATENT DOCUMENTS

| 2005/0068475 A1* | 3/2005 | Kume ............... G02F 1/133526 349/95 |
| 2018/0252964 A1 | 9/2018 | Nakaoka et al. |
| 2020/0103700 A1* | 4/2020 | Nakaoka ............... G02F 1/1326 |

FOREIGN PATENT DOCUMENTS

JP          H9-318942 A       12/1997

* cited by examiner

*Primary Examiner* — Nelson M Rosario
*Assistant Examiner* — Scott D Au
(74) *Attorney, Agent, or Firm* — Michael Best & Friedrich LLP

(57) ABSTRACT

According to one embodiment, in a display device, a display substrate includes color filters of a plurality of colors arranged in a display area. The color filters are arranged in different colors alternately in a first direction and the same colors in a second direction orthogonal to the first direction. A first separation substrate separates wavelength light from received backlight according to the arrangement of the colors in the first direction, and outputs the separated light to a second separation substrate. The second separation substrate separates wavelength light from the received light from the first separation substrate according to the color of each row in the second direction, and outputs the separated light to the display substrate.

4 Claims, 9 Drawing Sheets

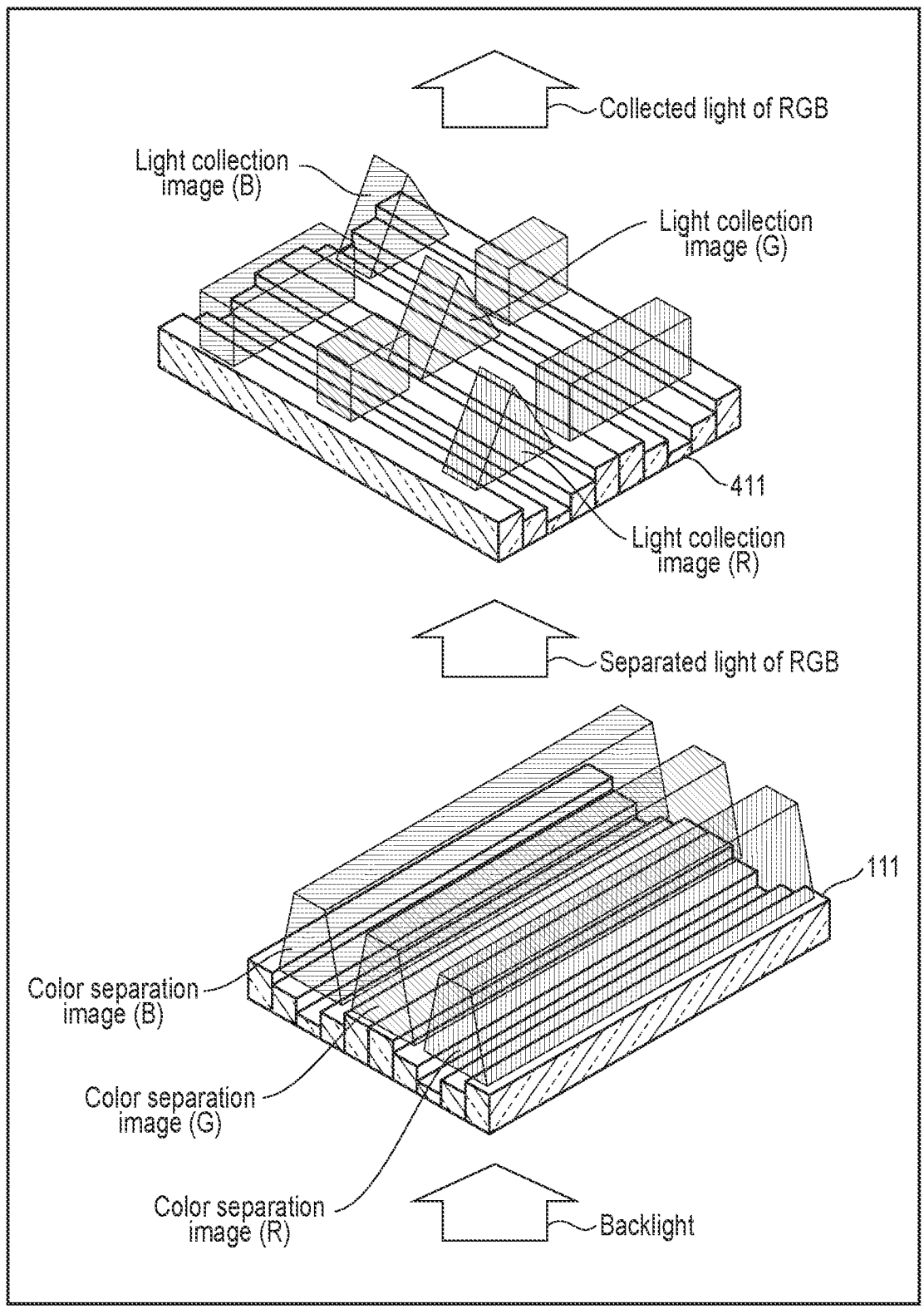
F I G. 3

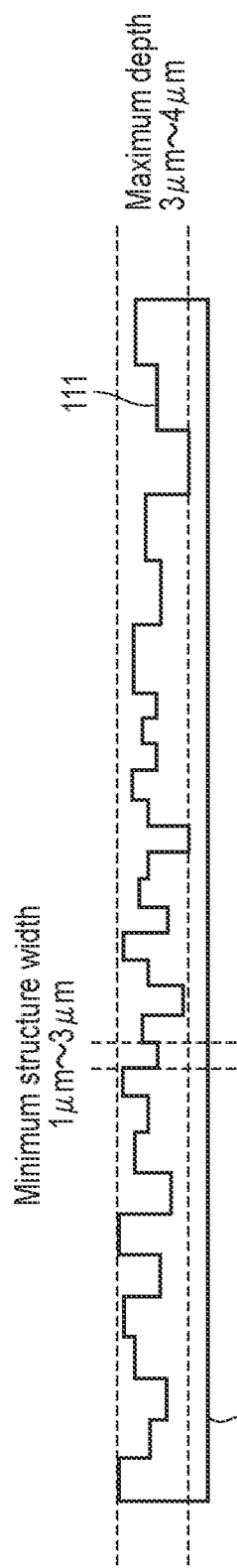
F I G. 8

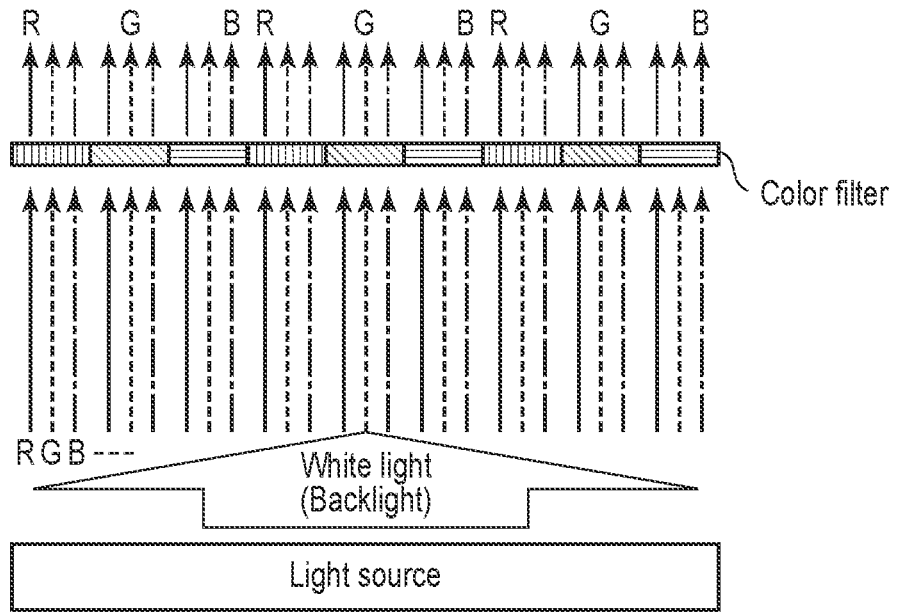
F I G. 9A
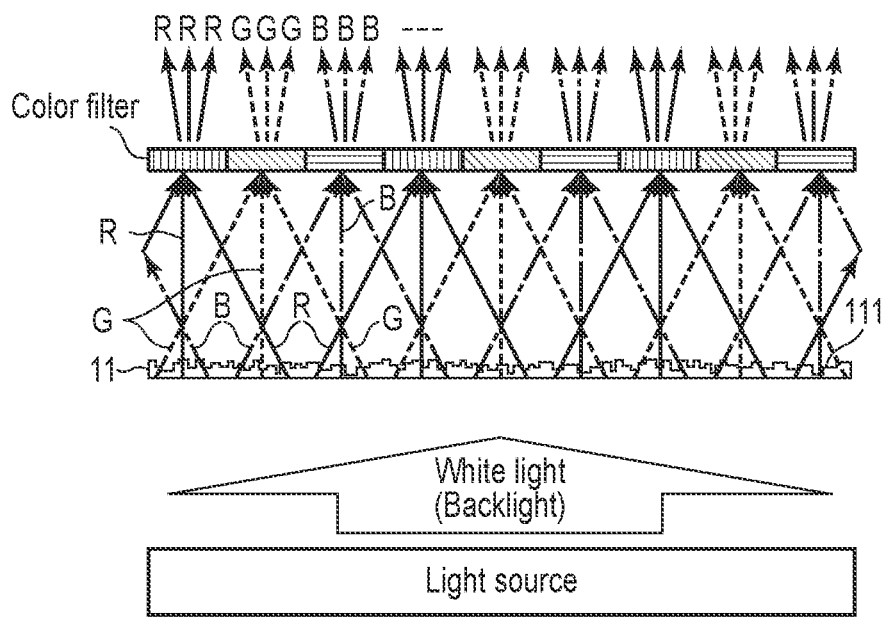
F I G. 9B

DISPLAY DEVICE

CROSS-REFERENCE TO RELATED APPLICATIONS

This application is based upon and claims the benefit of priority from Japanese Patent Application No. 2022-094445, filed Jun. 10, 2022, the entire contents of which are incorporated herein by reference.

FIELD

Embodiments described herein relate generally to a display device using a color separation element technology.

BACKGROUND

A display device of a color filter (hereinafter referred to as CF) method used in a liquid crystal display module, makes wavelength light of a color of CF transmitted and absorbs wavelength light other than CF, by making a white backlight from a light source incident on a filter of each of RGB pixels in accordance with a display image, for a liquid crystal panel where the CF of RGB is formed in a pixel unit, i.e., a panel formed by stacking a CF substrate on a thin-film-transistor (TFT) substrate. As a result, the efficiency of use of light is low. Therefore, optical separation element technology has been proposed for the purpose of increasing the light utilization efficiency.

The optical separation element technology makes white backlight incident, and diffracts and separates the white backlight in a specific direction for each wavelength component of RGB, by a color separation element obtained by forming color separation grooves based on irregularities of a predetermined pattern on a surface of a glass substrate. According to this technology, in a CF-type display device, glass substrates on which the above color separation elements are formed (hereinafter referred to as "color separation element substrates") are opposed between the light source of the backlight and the TFT substrate, the backlight is separated into wavelengths corresponding to respective CF of RGB by the color separation element, which are diffracted in specified directions, only light of the wavelengths corresponding to the CF is made incident on filters of respective RGB pixels through the TFT substrate. Thus, absorption of the light other than the wavelengths corresponding to the CF is reduced and the light (luminance) utilization efficiency is improved.

However, the RGB array of CF is a stripe array in which the RGB are aligned in a predetermined order in one direction and the same color is arranged in the other direction on the screen and, according to this, the color separation grooves on the color separation element substrate have a stripe structure in which a plurality of uneven patterns are aligned in one direction and the same pattern is continuous in the other direction.

However, in the display device based on the above configuration, while the CF of RGB are separated by frames and arrayed, respectively, the color separation grooves on the color separation element substrate are continuous, and the separated light is blocked in the frame area on the CF side. It is assumed that the frames described here correspond to, for example, a known black matrix formed on the CF substrate to partition the pixels.

BRIEF DESCRIPTION OF THE DRAWINGS

FIG. 3 is an exploded perspective view showing color separation groove formation directions, color separation images, and light collection images for each of first and second color separation element substrates of the display device of the first embodiment.

FIG. 8 is a cross-sectional view showing a specific structure of a color separation element applied to the present embodiment.

FIG. 9A and FIG. 9B are cross-sectional views each showing a specific processing example of the color separation element shown in FIG. 8.

DETAILED DESCRIPTION

Figure 1:
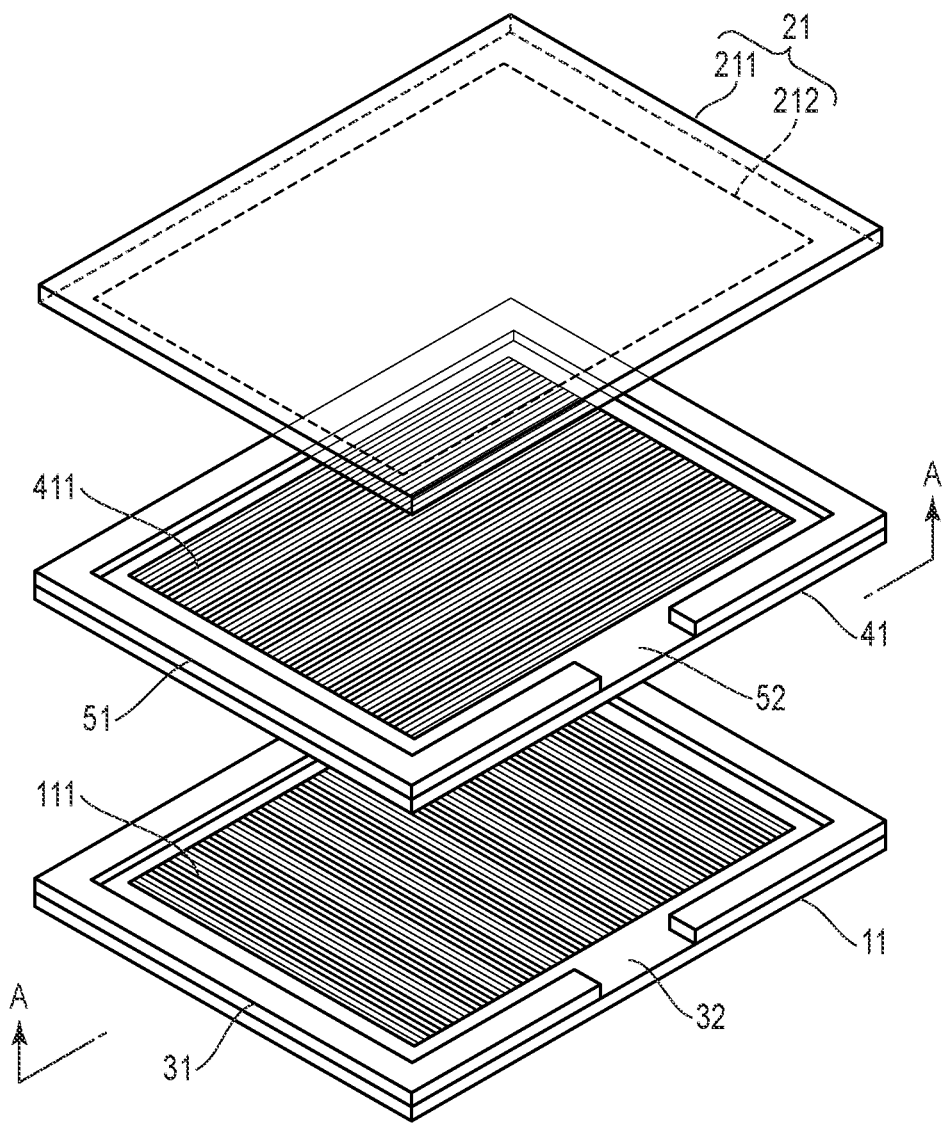
FIG. 1 is an exploded perspective view showing a basic configuration of a display device of a first embodiment.

In general, according to one embodiment, a display device includes a liquid crystal display substrate, a first color separation element substrate and a second color separation element substrate. The liquid crystal display substrate has a stripe structure where color filters of a plurality of colors are arranged in a display area while arranging different colors alternately in a first direction and the same colors are arranged in a second direction orthogonal to the first direction, each of the color filters of the plurality of colors is partitioned in the first and second directions by a frame. The first color separation element substrate is opposed to the liquid crystal display substrate, and in which a color separation groove having backlight from a light source made incident thereon, separating each wavelength light in accordance with color arrangement of the color filters by an uneven pattern of grooves formed in the first direction in a display area, and outputting the separated wavelength light for each color to a color filter of a corresponding color, is formed. The second color separation element substrate is arranged between the liquid crystal display substrate and the first color separation element substrate, and in which a color separation groove having the separated light from the first color separation element substrate made incident thereon, separating each wavelength light in accordance with a color of each row in the second direction of the color filter by the uneven pattern of groove formed in the same direction as the second direction in a display area, and outputting the separated wavelength light for each color to a color filter in a row of a corresponding color is formed. The liquid crystal display substrate and the first color separation element substrate are stacked by bonding peripheral portions of the respective substrates by a bonding layer in a predetermined thickness while the second color separation element substrate is sandwiched between the substrates.

According to the above configuration, blocking the color-separated light in the frame area on the color filter side can be suppressed and the light utilization efficiency can be improved.

Various embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First, a color separation element applied to the embodiments will be described with reference to FIG. 8, FIG. 9A, and FIG. 9B.

FIG. 8 is a cross-sectional view showing a specific structure of a color separation element, and FIG. 9A and FIG. 9B are cross-sectional views showing an example of color separation of a backlight using the color separation element shown in FIG. 8.

In other words, as shown in FIG. 8, the color separation element is obtained by forming grooves having a minimum structural width of 1 μm to 3 μm and a maximum depth of 3 μm to 4 μm a glass substrate in a predetermined pattern corresponding to RGB. The above grooves are referred to as color separation grooves 111. In addition, the glass substrate on which the color separation grooves 111 are formed is referred to as a color separation element substrate 11.

When the backlight (white light) emitted from a light source is made incident on a color filter as it is, light other than R, G, and B is absorbed by the R, G, and B filters as shown in FIG. 9A. In contrast, when the backlight (white light) is made incident on the color filters via the color separation element substrate 11, the R, G, and B light is diffracted in different directions and collected on the respective color filters as shown in FIG. 9B. Since light absorption in the color filters is thereby reduced, the light (luminance) utilization efficiency can be improved.

Embodiments of a display device using the above-described color separation element substrate 11 will be described below. In the following descriptions, the display screen is set to landscape orientation, and its long direction is referred to as a horizontal direction and its short direction is referred to as a vertical direction. In addition, it is assumed that each of the R area, the G area, and the B area of CF is repeatedly arranged in the horizontal direction and continuously arranged in the vertical direction. The configuration of the embodiment and its advantages are the same when the display screen is set to portrait orientation, its long direction is referred to as the vertical direction, and its short direction is referred to as the horizontal direction.

First Embodiment

Figure 2:
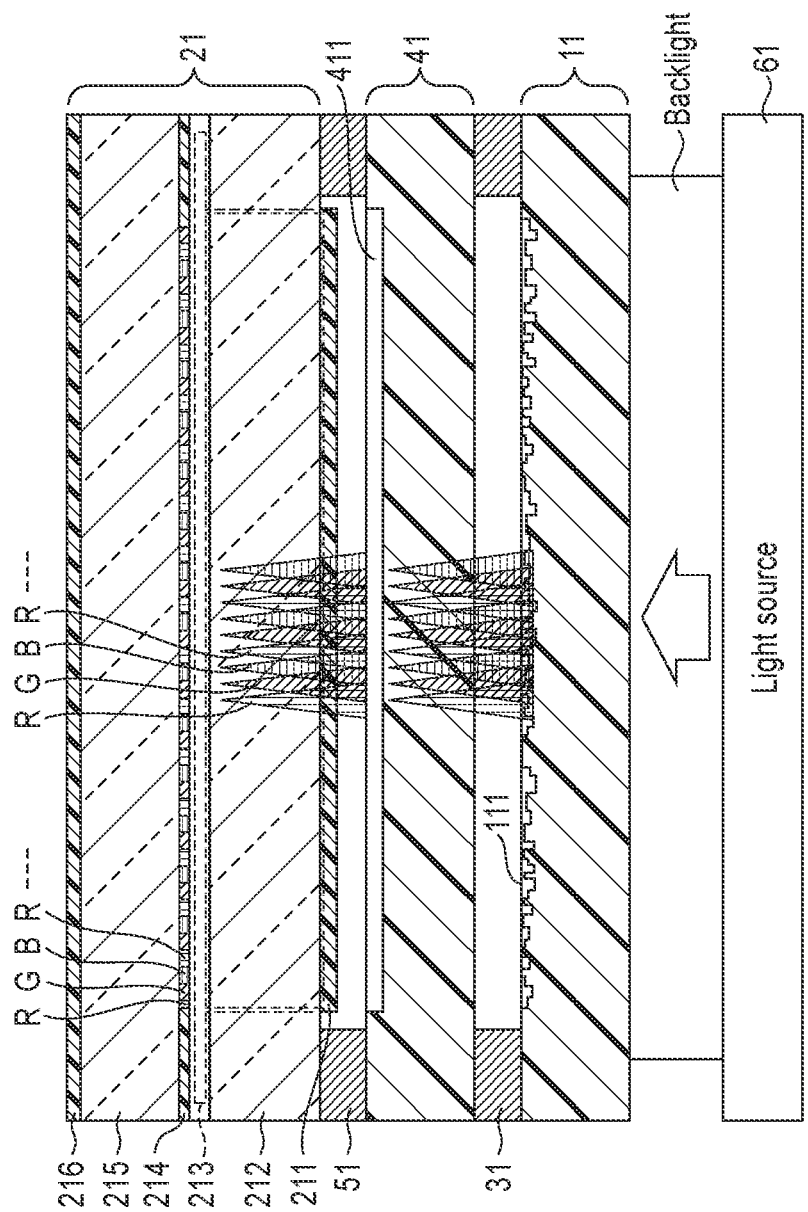
FIG. 2 is a cross-sectional view showing a stacked configuration of the display device of the first embodiment.

FIG. 1 is an exploded perspective view showing a basic configuration of the display device of the first embodiment, FIG. 2 is a cross-sectional view showing a stacked configuration of the display device shown in FIG. 1 in cross-section along line A-A, and FIG. 3 is a front view showing the structure of the color separation element substrate of the display device of the embodiment compared to a conventional structure. The display device shown in FIG. 1 and FIG. 2 has a stacked structure in which a first color separation element substrate 11, a second color separation element substrate 41 and a liquid crystal panel 21 are joined at a certain thickness via a bonding layer 31, 51 formed of a double-sided tape or a sealing material.

First, in the color separation element substrate 11, a bonding area having a certain width is secured at a peripheral portion, and color separation grooves 111 are formed in the display effective area on its inner and upper surface. The color separation grooves 111 have a stripe structure in which the depth of the grooves is continuous in the vertical direction. In addition, in a second color separation element substrate 41, a bonding area having a certain width is secured at a peripheral portion, and color separation grooves 411 are formed in the display effective area of the inner and upper surface, similarly to the color separation element substrate 11. However, the color separation grooves 411 have a stripe structure in which the depth of the grooves is continuous in the horizontal direction.

In contrast, the liquid crystal panel 21 has a structure in which a lower polarizer 211, a TFT substrate 212, a liquid crystal layer 213, a CF layer 214, a CF glass substrate 215, and an upper polarizer 216 are stacked in order from the incident side of the backlight emitted from a light source 61. On the TFT substrate 212, a bonding area having a certain width is secured at a peripheral part on the incident surface side of the backlight. The lower polarizer 211 is attached to the display effective area inside the bonding area.

In addition, a pixel TFT is provided for each of a plurality of pixels on the glass substrate, on the TFT substrate 212, which will not be described in detail. The CF glass substrate 215 including the CF layer 214 is referred to as a CF substrate. The TFT substrate 212 is bonded to the CF substrate by a sealing material layer containing a gap material, and the liquid crystal layer 213 is sealed between the TFT substrate 212 and the CF substrate by the sealing material layer.

Cutaway portions serving as air holes 32 and 52 are formed, respectively, in a part of the above bonding layer 31 which bonds the first color separation element substrate 11 to the second color separation element substrate 41 and a part of the bonding layer 51 which bonds the second color separation element substrate 41 to the liquid crystal panel 21. The air holes 32 and 52 function as a measure to prevent condensation in the inner space, preventing temperature differences from being made at portions between the outside of the display device, and the first color separation element substrate 11, the second color separation element substrate 41, and the lower polarizing plate 211, respectively, and preventing fogging (condensation) from occurring at the inside.

The color separation process using the first color separation element substrate 11 and the second color separation element substrate 41 according to the above structure separates the backlight into RGB along the groove formation direction, by the first color separation element substrate 11 in which the color separation grooves 111 are formed in the form of vertical stripes, separates the RGB separated light into light of the same colors in the groove formation direction, by the second color separation element substrate 41 in which the color separation grooves 411 are formed in the form of horizontal stripes, and consequently collects the light in each of RGB and outputs the light to the liquid crystal panel 21.

Advantages of the display device according to the above configuration will be described and compared to the conventional example, with reference to FIG. 4A, FIG. 4B FIG. 5A and FIG. 5B.

Figure 4A:
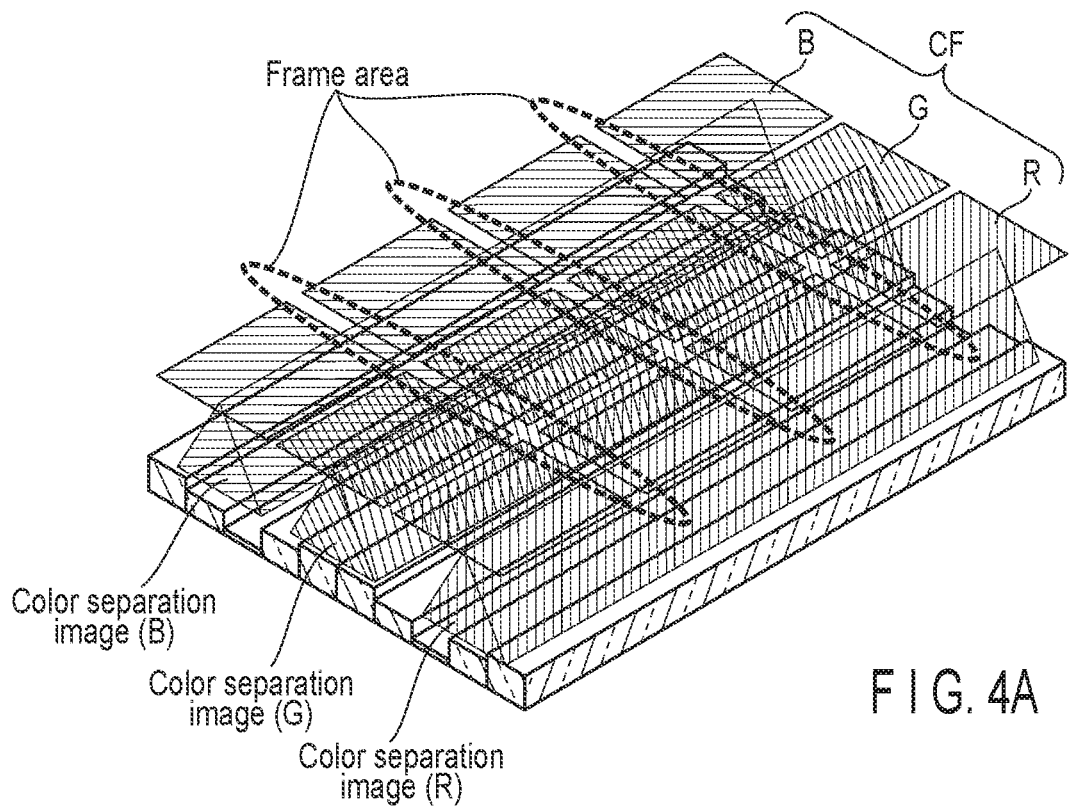
FIG. 4A and FIG. 4B are perspective views each showing a situation in which the color separation light of the color separation element substrate of the display device according to the first embodiment is collected on the CF, in comparison with a conventional structure.
Figure 4B:
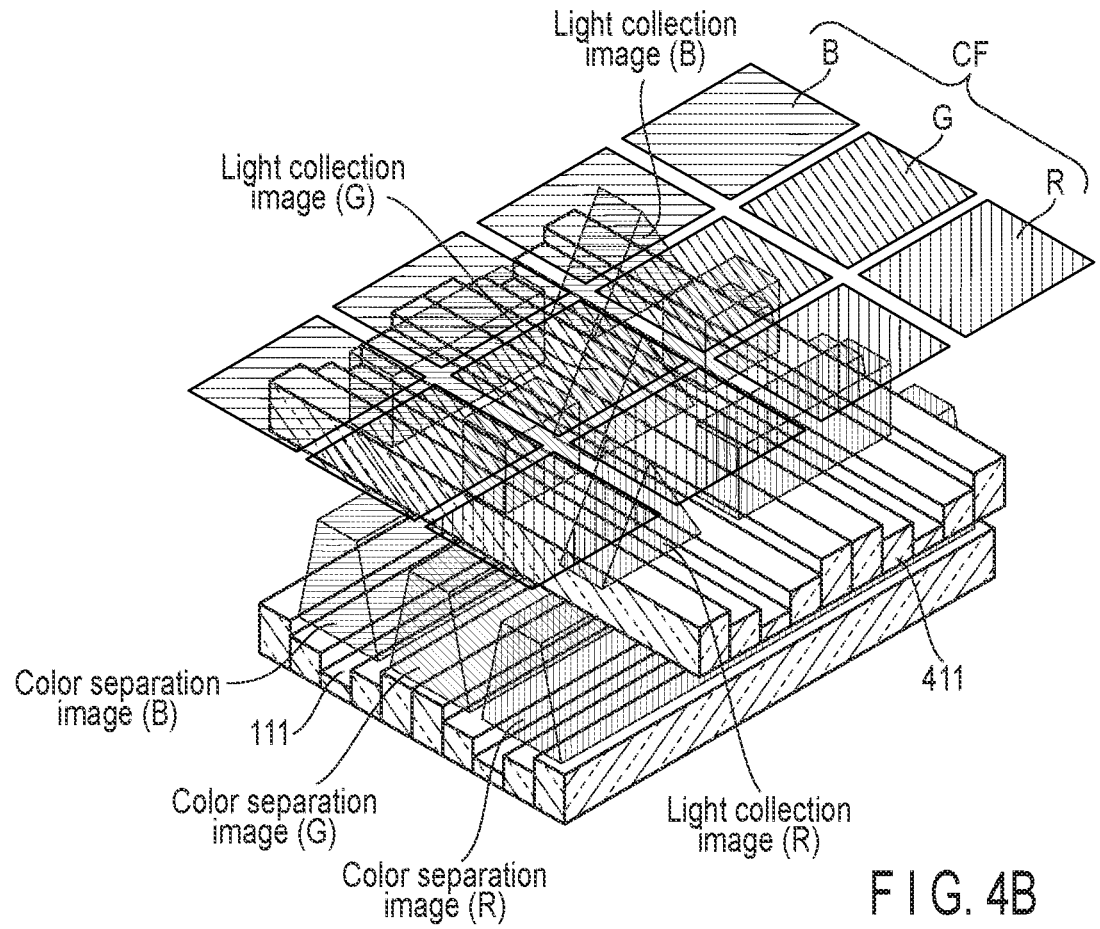
Figure 5A:
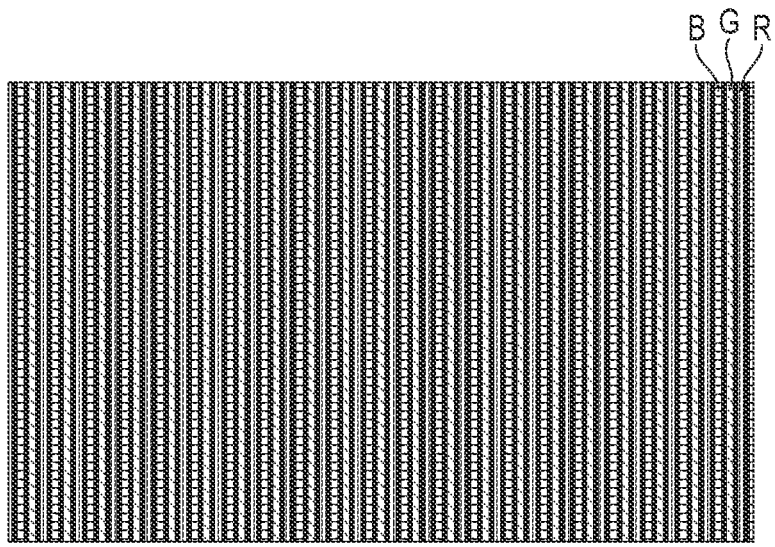
FIG. 5A and FIG. 5B are front views each showing color display of the display device according to the first embodiment, in comparison with a conventional example.
Figure 5B:
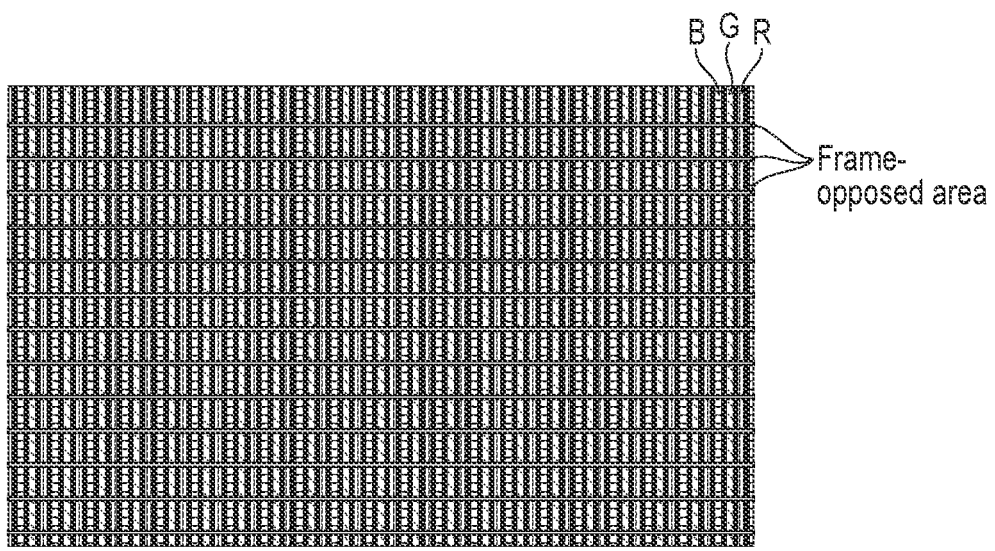

FIG. 4A and FIG. 4B shows a situation in which the color-separated light of the color separation element substrate of the display device of the embodiment is collected on the CF, and FIG. 4A is a perspective view showing the conventional schematic structure and FIG. 4B is a perspective view showing the schematic structure of the present embodiment. In addition, FIG. 5A and FIG. 5B shows comparison of the color display of the display device shown in FIG. 1 with the conventional structure, and FIG. 5A is a front view showing the conventional color display and FIG. 5B is a front view showing the color display of the present embodiment.

In the conventional structure, since the first color separation grooves 111 are only continuous in the vertical direction, light collected in the RGB effective area is also applied to a portion of the frame area other than the RGB effective area of CF, and this portion does not contribute to the improvement in luminance. Therefore, further improvement in luminance is attempted by collecting the light which does not contribute to the improvement in luminance, to the RGB effective area.

As its method, in the present embodiment, as shown in FIG. 4B, the second color separation element substrate 41 in which the color separation grooves are formed in the horizontal direction is arranged to be stacked on the first color separation element substrate 11 in which the color separation grooves are formed in the vertical direction. As a result, light applied to the frame area of CF as shown in FIG. 5A, in the conventional example, is refracted by the horizontally formed grooves 411 of the second color separation element substrate 41, the light in the frame-opposed area is collected in the RGB effective area as shown in FIG. 5B, and the effective utilization of the color separation light is increased, which contributes to the improvement in luminance.

In the conventional structure, white collimated light is separated into RGB by a color separation element and collected to each RGB position of the CF. Since the color separation grooves are formed in only one direction, the light collected on the RGB is also applied to the portion of the frame other than the RGB effective area of the CF, and this portion does not give influence to the increase in luminance.

Therefore, in the present embodiment, a second color separation is added between the first color separation of the lowermost layer and the CF, such that the light traveling to the frame area is collected to the RGB area of the CF.

However, since the grooves of the second color separation are formed in a direction orthogonal to the direction of the grooves of the first color separation, the grooves function not to collect light of all RGB wavelengths, but to collect any of the RGB light in each row such that this row collects R light and the next row collects G light. This function can be applied to enhancement of the luminance of a specific wavelength and the like when the luminance of each RGB color is uneven.

As described above, according to the present embodiment, since the color separation elements having directions of uneven portions different at 90 degrees are stacked, RGB can be separated in not only the vertical direction of the screen but also the horizontal direction, more luminance can be increased than that in the conventional example.

Second Embodiment

Figure 6:
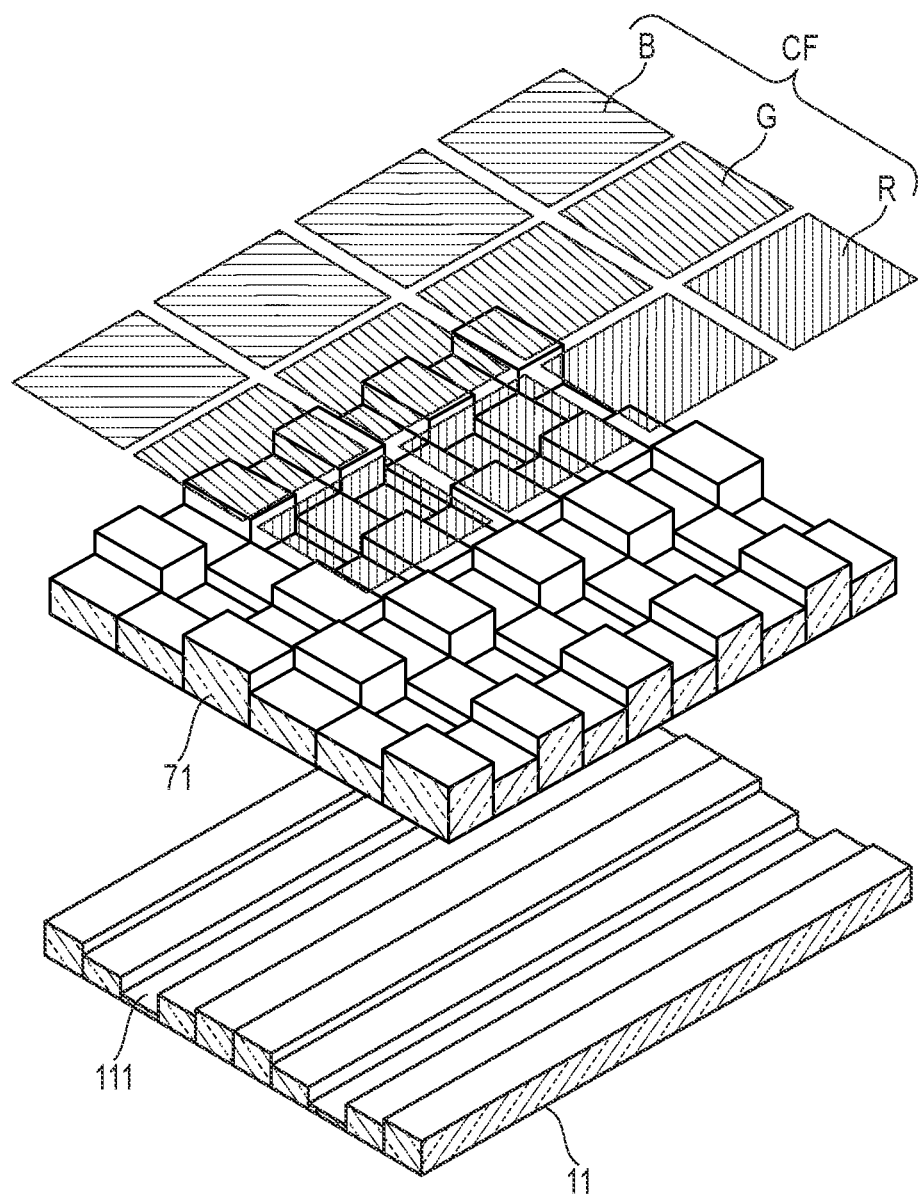
FIG. 6 is an exploded view showing a structure of a color separation element substrate of a display device of a second embodiment.

A second embodiment will be described with reference to FIG. 6, FIG. 7A, and FIG. 7B. FIG. 6 is an exploded perspective view showing a structure of a color separation element substrate of a display device according to the second embodiment, and FIG. 7A and FIG. 7B are perspective views each showing a color collecting function and a color collection example of a second color separation element substrate shown in FIG. 6.

The second color separation element substrate 41 in which the color separation grooves are formed in the horizontal direction is arranged to be stacked on the first color separation element substrate 11 in which the color separation grooves are formed in the vertical direction, in the first embodiment but, instead of the second color separation element substrate 41 in which the color separation grooves are formed in the horizontal direction, a second color separation element substrate 71 in which grooves including steps capable of collecting the light in each wavelength area of RGB are formed separately, is arranged as shown in FIG. 6, in the second embodiment.

Figure 7A:
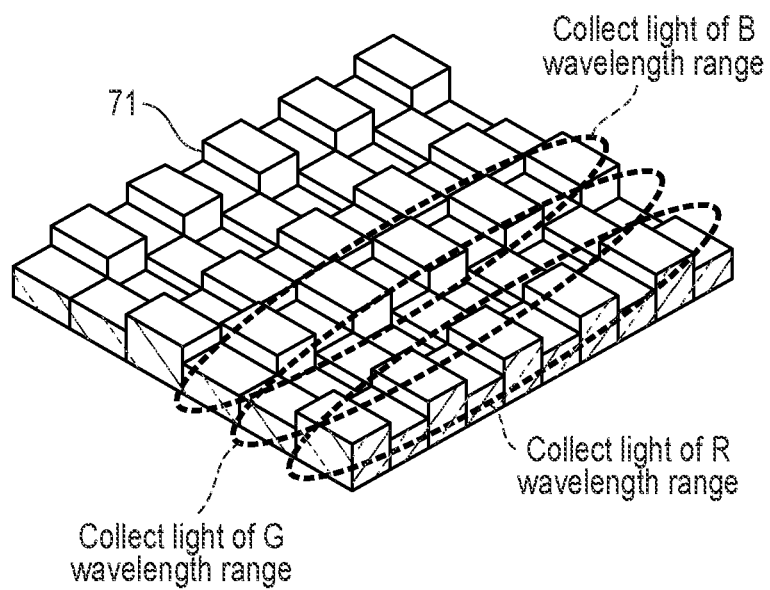
FIG. 7A and FIG. 7B are perspective views each showing a color collecting function and a color collection example of a second color separation element substrate shown in FIG. 6.
Figure 7B:
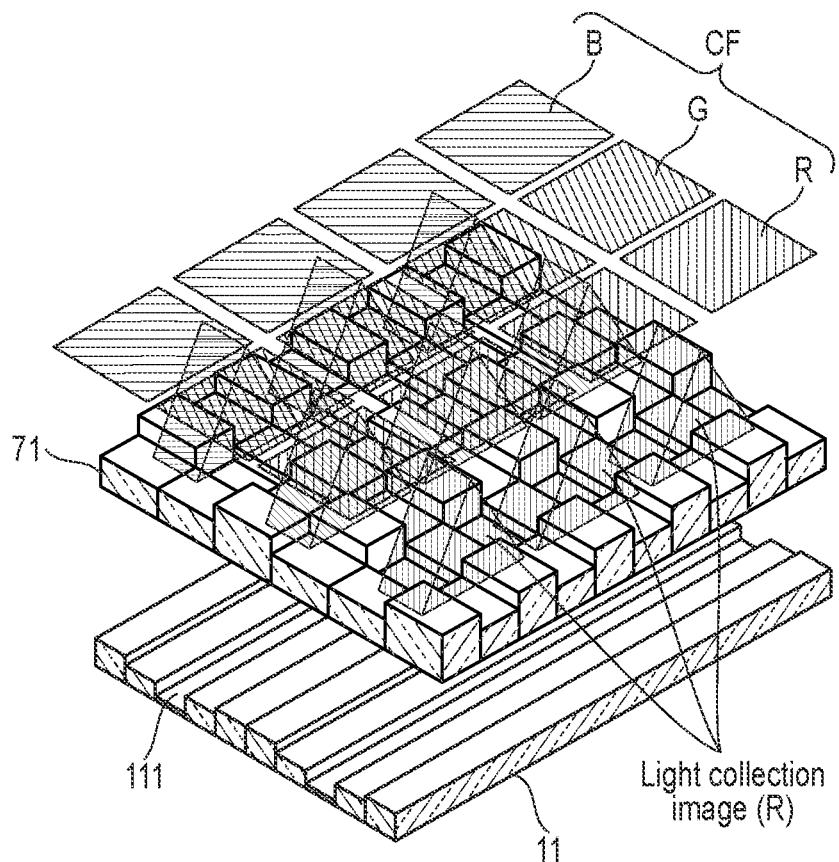

In the structure of the above-described second color separation element substrate 71, for all RGB wavelength regions, a step capable of collecting the light reaching the frame area of CF to each pixel of RGB is formed for all wavelength areas of RGB, as shown in FIG. 7A. Since the light applied to the frame area of the CF is collected on the RGB effective area as shown in FIG. 7B by stacking this second color separation element substrate 71 on the first color separation element substrate 11, the luminance is increased.

As described above, according to the display device of the present embodiment, the color-separated light blocked in the frame area on the CF side is collected in the RGB effective area, and the light utilization efficiency can be improved.

In the above-described embodiment, both the color separation element substrate and the TFT substrate are processed glass materials, but transparent materials such as resin may also be used.

The present invention is not limited to the embodiments described above but the constituent elements of the invention can be modified in various manners without departing from the spirit and scope of the invention. Various aspects of the invention can also be extracted from any appropriate combination of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
a liquid crystal display substrate in which, in a stripe structure where color filters of a plurality of colors are arranged in a display area while arranging different colors alternately in a first direction and the same colors are arranged in a second direction orthogonal to the first direction, each of the color filters of the plurality of colors is partitioned in the first and second directions by a frame;
a first color separation element substrate which is opposed to the liquid crystal display substrate, and in which a color separation groove having backlight from a light source made incident thereon, separating each wavelength light in accordance with color arrangement of the color filters by an uneven pattern of grooves formed in the first direction in a display area, and outputting the separated wavelength light for each color to a color filter of a corresponding color, is formed; and a second color separation element substrate which is arranged between the liquid crystal display substrate and the first color separation element substrate, and in which a color separation groove having the separated light from the first color separation element substrate made incident thereon, separating each wavelength light in accordance with a color of each row in the second direction of the color filter by the uneven pattern of groove formed in the same direction as the second direction in a display area, and outputting the separated wavelength light for each color to a color filter in a row of a corresponding color is formed, wherein the liquid crystal display substrate and the first color separation element substrate are stacked by bonding peripheral portions of the respective substrates by a bonding layer in a predetermined thickness while the second color separation element substrate is sandwiched between the substrates.

2. The display device according to claim 1, wherein the groove formed in the first direction formed in the first color separation element substrate and the groove formed in the second direction formed in the second color separation element substrate have a matrix structure which partitions a pixel area of the liquid crystal display substrate.

3. A display device comprising:

a liquid crystal display substrate in which, in a stripe structure where color filters of a plurality of colors are arranged in a display area while arranging different colors alternately in a first direction and the same colors are arranged in a second direction orthogonal to the first direction, each of the color filters of the plurality of colors is partitioned in the first and second directions by a frame;

a first color separation element substrate which is opposed to the liquid crystal display substrate, and in which a color separation groove having backlight from a light source made incident thereon, separating each wavelength light in accordance with color arrangement of the color filters by an uneven pattern of grooves formed in the same direction as the first direction in a display area, and outputting the separated wavelength light for each color to a color filter of a corresponding color, is formed; and a second color separation element substrate which is arranged between the liquid crystal display substrate and the first color separation element substrate, and in which a color separation groove having the separated light from the first color separation element substrate made incident thereon, separating each wavelength light in accordance with a color in each of rows in the second direction of the color filter by a step of a groove formed in the same direction as the second direction in a display area, and outputting the wavelength light to collect the wavelength light for each color separated for each of the rows to a color filter in a row of a corresponding color is formed, wherein the liquid crystal display substrate and the first color separation element substrate are stacked by bonding peripheral portions of the respective substrates by a bonding layer in a predetermined thickness while the second color separation element substrate is sandwiched between the substrates.

4. The display device according to claim 3, wherein the groove formed in the first direction formed in the first color separation element substrate and the groove formed in the second direction formed in the second color separation element substrate have a matrix structure which partitions a pixel area of the liquid crystal display substrate.

* * * * *